United States Patent
Umemoto et al.

(10) Patent No.: US 6,922,042 B2
(45) Date of Patent: Jul. 26, 2005

(54) DC/DC CONVERTER

(75) Inventors: Kiyotaka Umemoto, Kyoto (JP); Ko Takemura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 94 days.

(21) Appl. No.: 10/608,107

(22) Filed: Jun. 30, 2003

(65) Prior Publication Data

US 2004/0008528 A1 Jan. 15, 2004

(30) Foreign Application Priority Data

Jul. 9, 2002 (JP) ........................................ 2002-199406

(51) Int. Cl.$^7$ ................................................ G05F 1/40
(52) U.S. Cl. ........................ 323/283; 323/244; 323/901
(58) Field of Search ................................. 323/244, 901, 323/908, 282, 299, 303, 283, 284; 363/16, 20, 49

(56) References Cited

U.S. PATENT DOCUMENTS 5,610,503 A * 3/1997 Fogg et al. .................. 323/283
6,091,234 A * 7/2000 Kitagawa .................... 323/244

FOREIGN PATENT DOCUMENTS

JP 07-298614 11/1995

* cited by examiner

*Primary Examiner*—Rajnikant B. Patel
(74) *Attorney, Agent, or Firm*—Arent Fox PLLC

(57) ABSTRACT

A DC/DC converter produces from an input voltage a desired output voltage by first finding the error voltage between the output voltage and a first reference voltage and then controlling the output current according to the differential voltage between the error voltage and a second reference voltage. Used as the first reference voltage is whichever of a variable reference voltage and a first constant reference voltage is lower, and used as the second reference voltage is whichever of the variable reference voltage and a second constant reference voltage is lower. With this circuit configuration, an overshoot or undershoot in the output voltage can be prevented or reduced.

7 Claims, 3 Drawing Sheets

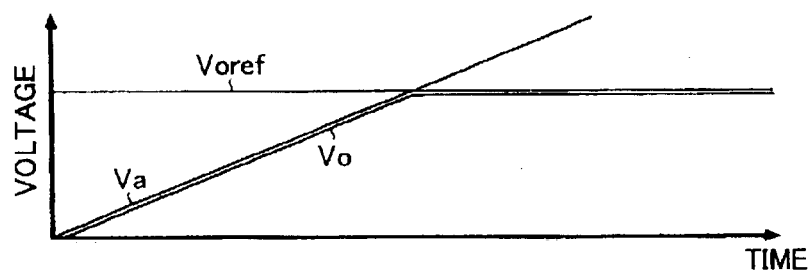
FIG. 4A
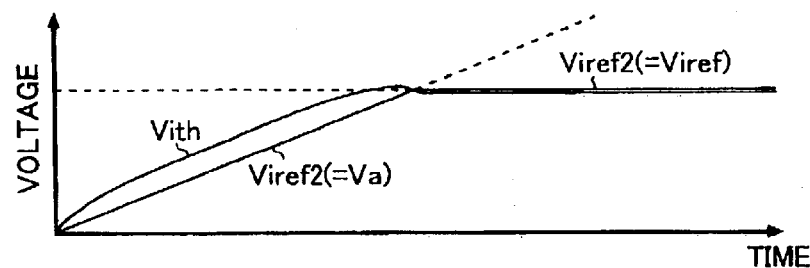
FIG. 4B
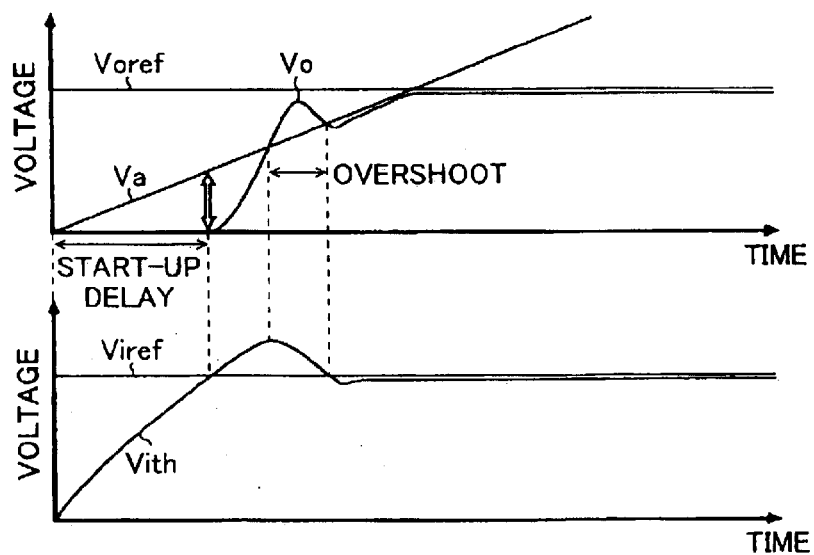
FIG. 5A Prior Art
FIG. 5B Prior Art

DC/DC CONVERTER

BACKGROUND OF THE INVENTION

1. Field of the Invention

The present invention relates to a DC/DC converter that converts a voltage input thereto to a predetermined voltage for output, and more particularly to a DC/DC converter that produces the desired output voltage from the input voltage by first finding the error voltage between the output voltage and a first reference voltage and then controlling the output current according to the differential voltage between the error voltage and a second reference voltage.

2. Description of the Prior Art

Some conventional DC/DC converters use a soft-start capacitor, as exemplified by the one disclosed in Japanese Patent Application Laid-Open No. H7-298614.

Such a DC/DC converter is thereby not only protected against an overcurrent but also made capable of preventing a rush current from flowing into the load at start-up.

However, in the DC/DC converter described above, when the error voltage Vith (a voltage obtained by amplifying the differential voltage between the output voltage Vo and an output voltage setting reference voltage Voref) is compared with an output current setting reference voltage Viref to control the output voltage Vo, because this reference voltage Viref is constant and in addition because a CR circuit used for phase compensation (for prevention of oscillation) makes blunt the rise of the error voltage Vith at start-up, it takes a considerable time for the error voltage Vith to reach the reference voltage Viref as shown in FIGS. 5A and 5B. During the period in which the error voltage Vith is lower than the reference voltage Viref, the DC/DC converter can produce only an output current "io" of negative (or extremely low) magnitude. This produces, immediately after start-up, a period in which the output voltage Vo does not rise. This delay in the rise of the output voltage Vo allows the charging of the soft-start capacitor to proceed, raising its terminal voltage Va (a variable reference voltage for achieving soft starting that, only at the initial stage of start-up, substitutes for the reference voltage Voref so as to be compared with the output voltage Vo). Thus, when the error voltage Vith eventually reaches the reference voltage Viref, there already is a great difference between the output voltage Vo and the terminal voltage Va, with the result that the output voltage Vo rises comparatively abruptly.

Thereafter, when the output voltage Vo rises until it reaches the terminal voltage Va (or the constant reference voltage Voref), the error voltage Vith starts falling. Also here, as described above, the phase compensation CR circuit makes blunt the fall of the error voltage Vith. Thus, it takes a considerable time for the error voltage Vith to become lower than the output current setting reference voltage Viref. Accordingly, the DC/DC converter produces an excessive output current "io" even after the output voltage Vo has reached the terminal voltage Va (or the constant reference voltage Voref), possibly causing an overshoot in the output voltage Vo. Such an overshot in the output voltage Vo needs to be prevented or reduced as much as possible, because it may put a burden on the output transistor and the load not only, needless to say, when its peak level exceeds the constant reference voltage Voref but also even when it does not.

Furthermore, the DC/DC converter described above gives no consideration to an undershoot in the output voltage Vo at shut-down.

SUMMARY OF THE INVENTION

An object of the present invention is to provide a DC/DC converter that prevents destruction of the output transistor resulting from an overcurrent and deterioration of the load by eliminating or reducing an abrupt rise in the output voltage at start-up and the resulting overshoot therein and/or an abrupt fall in the output voltage at shut-down and the resulting undershoot therein.

To achieve the above object, according to the present invention, a DC/DC converter that produces from an input voltage a desired output voltage by first finding the error voltage between the output voltage and a first reference voltage and then controlling the output current according to the differential voltage between the error voltage and a second reference voltage is so configured as to use, as the first reference voltage, whichever of a variable reference voltage and a first constant reference voltage is lower and, as the second reference voltage, whichever of the variable reference voltage and a second constant reference voltage is lower.

BRIEF DESCRIPTION OF THE DRAWINGS

This and other objects and features of the present invention will become clear from the following description, taken in conjunction with the preferred embodiments with reference to the accompanying drawings in which:

FIGS. 4A and 4B are diagrams showing the voltage waveforms observed at relevant points in the DC/DC converter embodying the invention; and FIGS. 5A and 5B are diagrams showing the voltage waveforms observed at relevant points in a conventional DC/DC converter.

DESCRIPTION OF THE PREFERRED EMBODIMENTS

Figure 1:
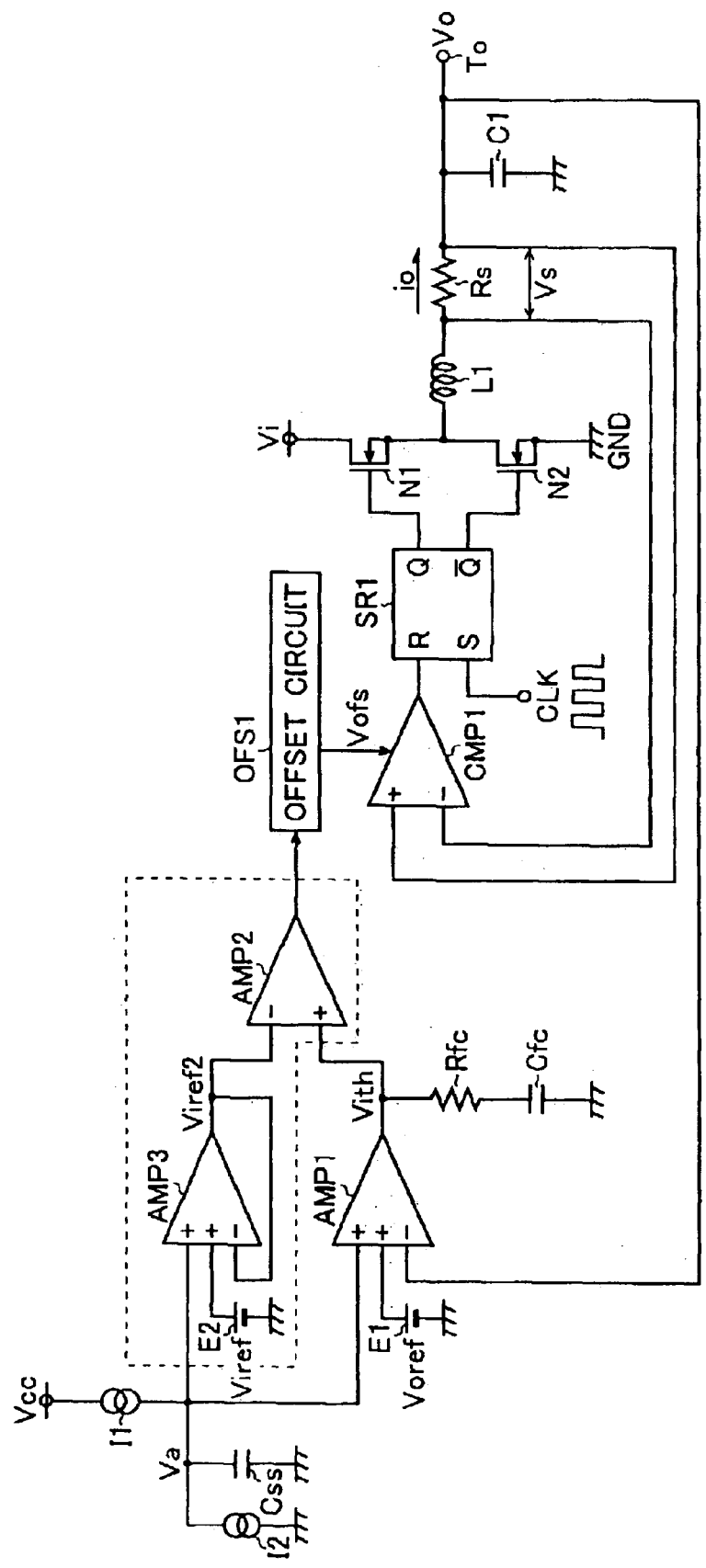
FIG. 1 is a circuit diagram showing the configuration of a principal portion of a DC/DC converter embodying the invention.

FIG. 1 is a circuit diagram showing the configuration of a principal portion of a DC/DC converter embodying the invention. As shown in this figure, the DC/DC converter of this embodiment is a synchronous-rectification DC/DC converter that has a pair of N-channel MOS field-effect transistors N1 and N2 (hereinafter referred to as the FETs N1 and N2) connected in series between two different potentials (an input potential Vi and a ground potential GND) to function as switching devices and that yields a desired output voltage Vo from the node between the FETs N1 and N2 through an LC filter (a coil L1 and a capacitor C1).

The drain of the FET N1 is connected to a supply voltage line, and the source of the FET N2 is grounded. The source of the FET N1 and the drain of the FET N2 are connected together, and the node between them is connected through an output coil L1 to one end of a sense resistor Rs. The other end of the sense resistor Rs is connected to an output terminal To, and is also grounded through an output capacitor C1.

The one and other ends of the sense resistor Rs are also connected to the inverting input terminal (−) and non-inverting input terminal (+) of a comparator CMP1, respectively. To one of these input terminals of the comparator CMP1 is fed an offset voltage Vofs that is varied by an offset circuit OFS1. That is, the comparator CMP1 is so configured as to change its output level according to whether the voltage Vs across the sense resistor Rs, which varies according to the output current "io," is higher than the offset voltage Vofs or not.

The output terminal of the comparator CMP1 is connected to the reset terminal (R) of a reset-priority SR flip-flop SR1. The set terminal (S) of the flip-flop SR1 is connected to a clock terminal by way of which a clock signal CLK (200 [kHz] to 1 [MHz]) is fed in, and the output terminal (Q) and inverting output terminal (Q overscored) of the flip-flop SR1 are connected to the gates of the FETs N1 and N2, respectively.

Thus, when the reset signal to the flip-flop SR1 is low and the set signal thereto is high, the FET N1 is on and the FET N2 is off. By contrast, when the reset signal to the flip-flop SR1 is low and the set signal thereto is low, the FET N1 is off and the FET N2 is on. Incidentally, when the reset signal is high, irrespective of the set signal, the FET N1 is off (the FET N2 is indefinite). In this configuration, when the voltage Vs across the sense resistor Rs reaches the offset voltage Vofs, the reset signal to the flip-flop SR1 is high, which causes the FET N1 to stop its switching operation.

The output terminal To of the DC/DC converter is connected to the inverting input terminal (−) of an amplifier AMP1. The amplifier AMP1 has two non-inverting input terminals (+) and one inverting input terminal (−), and is so configured as to produce an error voltage Vith by amplifying a differential voltage between whichever of the voltages fed to the two non-inverting input terminals (+) (a variable reference voltage Va and a first constant reference voltage Voref, both described later) is lower and the output voltage Vo fed to the inverting input terminal (−).

The first non-inverting input terminal (+) of the amplifier AMP1 is connected to one end of a constant current source I1 of which the other end is connected to the supply voltage line (supply voltage Vcc). The former (i.e., the "one") end of the constant current source I1 is grounded through a soft-start capacitor Css, and is also ground through a constant current source I2. Thus, the amplifier AMP1 receives, at its first non-inverting input terminal (+), a variable reference voltage Va that starts rising at start-up and that starts falling at shut-down. The second non-inverting input terminal (+) of the amplifier AMP1 is connected to the positive terminal of a direct-current voltage source E1 (producing a first constant reference voltage Voref). The negative terminal of the direct-current voltage source E1 is grounded.

The output terminal of the amplifier AMP1 is connected to the non-inverting input terminal (+) of an amplifier AMP2, and is also grounded through a phase compensation resistor Rfc and a phase compensation capacitor Cfc. The inverting input terminal (−) of the amplifier AMP2 is connected to the output terminal of an amplifier AMP3. The output terminal of the amplifier AMP2 is connected to the offset voltage control terminal of the offset circuit OFS1.

The amplifier AMP3 has two non-inverting input terminals (+) and one inverting input terminal (−), and is so configured as to output as an output current setting reference voltage Viref2 whichever of the voltages fed to the two non-inverting input terminals (+) (the variable reference voltage Va and a second constant reference voltage Viref, described later) is lower.

The first non-inverting input terminal (+) of the amplifier AMP3 is connected to the node between a constant current source I1, which operates at the time of charging, a constant current source I2, which operates at the time of discharging, and the soft-start capacitor Css. To this input terminal of the amplifier AMP3 is fed the variable reference voltage Va. The second non-inverting input terminal (+) of the amplifier AMP3 is connected to the positive terminal of a direct-current voltage source E2 (producing a second constant reference voltage Viref). The negative terminal of the direct-current voltage source E2 is grounded. The output terminal of the amplifier AMP3 is connected to the inverting input terminal (−) of the amplifier AMP2, and also to the inverting input terminal (−) of the amplifier AMP3 itself.

Figure 2:
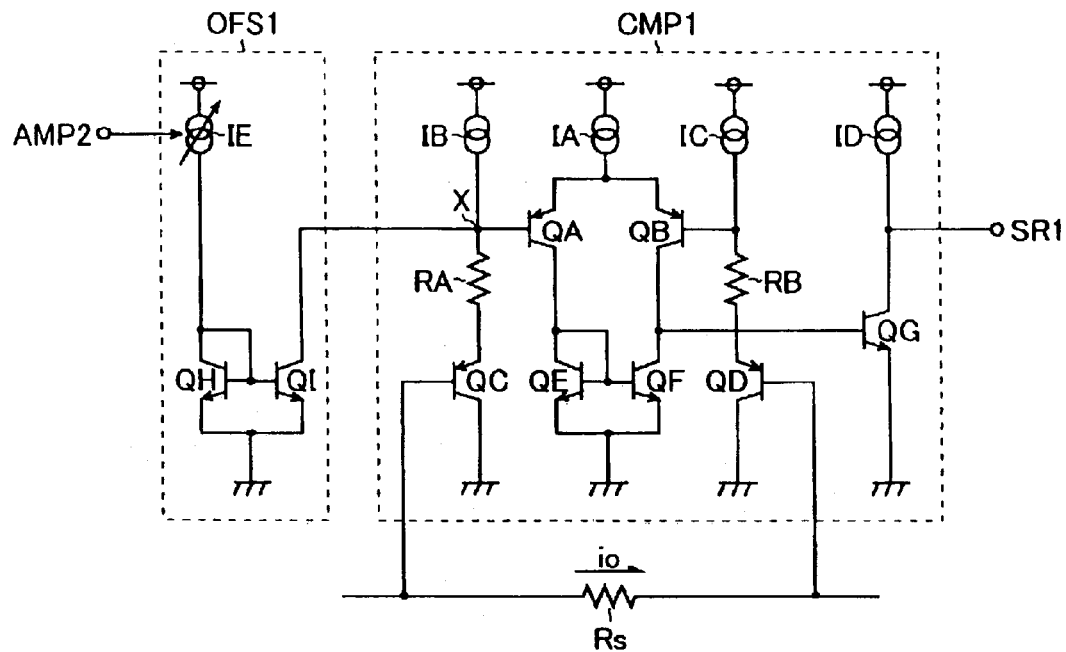
FIG. 2 is a circuit diagram showing an example of the configuration of the comparator CMP1 and the offset circuit OFS1.

Next, with reference to FIG. 2, the internal configuration of the comparator CMP1 and the offset circuit OFS1 will be described in detail. FIG. 2 is a circuit diagram showing an example of the configuration of the comparator CMP1 and the offset circuit OFS1. As shown in this figure, in this embodiment, the comparator CMP1 is composed of pnp-type bipolar transistors QA, QB, QC, and QD, npn-type bipolar transistors QE, QF, and QG, constant current sources IA, IB, IC, and ID, and resistors RA and RB.

The emitters of the transistors QA and QB are connected together, and the node between them is connected through the constant current source IA to the supply voltage line. The base of the transistor QA is connected through the constant current source IB to the supply voltage line, and is also connected through the resistor RA to the emitter of the transistor QC. The base of the transistor QB is connected through the constant current source IC to the supply voltage line, and is also connected through the resistor RB to the emitter of the transistor QD. The collectors of the transistors QC and QD are each grounded, and their bases are connected to one and the other end of the sense resistor Rs, respectively.

The collector of the transistor QA is connected to the collector of the transistor QE, and the collector of the transistor QB is connected to the collector of the transistor QF. The bases of the transistors QE and QF are connected together, and the node between them is connected to the collector of the transistor QE. The emitters of the transistors QE and QF are connected together, and the node between them is grounded.

The node between the collectors of the transistors QB and QF is connected to the base of the transistor QG. The collector of the transistor QG is connected through the constant current source ID to the supply voltage line, and is also connected, as the output terminal of the comparator CMP1, to the reset terminal (R) of the flip-flop SR1. The emitter of the transistor QG is grounded.

On the other hand, the offset circuit OFS1 is composed of a pair of npn-type bipolar transistors QH and QI constituting a current mirror circuit and a variable current source IE that varies its output current according to the output voltage of the amplifier AMP2. The collector of the transistor QH is connected through the variable current source IE to the supply voltage line. The collector of the transistor QI is connected to the node X between the transistor QA, constant current source IB, and resistor RA included in the comparator CMP1. The bases of the transistors QH and QI are connected together, and the node between them is connected to the collector of the transistor QH. The emitters of the transistors QH and QI are connected together, and the node between them is grounded.

In the comparator CMP1 and the offset circuit OFS1 configured as described above, as the output current of the variable current source IE varies according to the output voltage of the amplifier AMP2, the current that flows through the resistor RA varies. Thus, the potential at the node X also varies. That is, the offset circuit OFS1 feeds an offset voltage Vofs commensurate with the output voltage of the amplifier AMP2 to the node X, and accordingly the comparator CMP1 changes its output level according to whether the voltage Vs across the sense resistor Rs is higher than the offset voltage Vofs or not.

Figure 3:
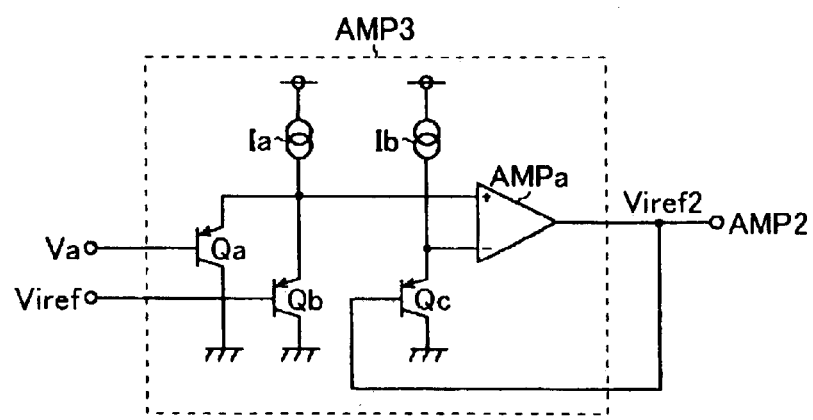
FIG. 3 is a circuit diagram showing an example of the configuration of the amplifier AMP3.

Next, with reference to FIG. 3, the internal configuration of the amplifier AMP3 will be described in detail. As shown in this figure, in this embodiment, the amplifier AMP3 is composed of pnp-type bipolar transistors Qa, Qb, and Qc, constant current sources Ia and Ib, and an amplifier AMPa.

The base of the transistor Qa serves as the first non-inverting input terminal to which the variable reference voltage Va is fed. The base of the transistor Qb serves as the second non-inverting input terminal to which the second constant reference voltage Viref is fed. The base of the transistor Qc serves as the inverting input terminal to which the output current setting reference voltage Viref2 is fed.

The emitters of the transistors Qa and Qb are connected together, and the node between them is connected through the constant current source Ia to the supply voltage line, and is also connected to the non-inverting input terminal (+) of the amplifier AMPa. The collectors of the transistors Qa and Qb are each grounded. The inverting input terminal (−) of the amplifier AMPa is connected through the constant current source Ib to the supply voltage line, and is also connected to the emitter of the transistor Qc. The collector of the transistor Qc is grounded. The output terminal of the amplifier AMPa, which serves as the output terminal of the amplifier AMP3, is connected to the inverting input terminal (−) of the amplifier AMP2, and is also connected to the base of the transistor Qc.

Configured as described above, the amplifier AMP3 feeds, as the output current setting reference voltage Viref2, whichever of the variable reference voltage Va and the second constant reference voltage Viref is lower to the inverting input terminal (−) of the amplifier AMP2.

Next, with reference to FIGS. 4A and 4B, how the DC/DC converter configured as described above operates at start-up will be described in detail. FIGS. 4A and 4B are diagrams showing the voltage waveforms observed as relevant points in the DC/DC converter of the invention. In these diagrams, voltage is taken along the vertical axis, and the lapse of time is taken along the horizontal axis.

As shown in these figures, when the DC/DC converter of this embodiment is started up by starting the supply of electric power thereto, as the soft-start capacitor Css is charged, the variable reference voltage Va starts rising gently. Here, during the period until the variable reference voltage Va becomes higher than the first constant reference voltage Voref, the amplifier AMP1 uses the variable reference voltage Va as an output voltage setting reference voltage with which it compares the output voltage Vo. Moreover, during the period until the variable reference voltage Va becomes higher than the second constant reference voltage Viref, the amplifier AMP3 outputs the variable reference voltage Va as the output current setting reference voltage Viref2.

In this way, immediately after start-up, the variable reference voltage Va, i.e., the terminal voltage of the soft-start capacitor Css, is used as the output current setting reference voltage Viref2 with which the error voltage Vith is compared. This permits the output current setting reference voltage Viref2 to rise gently at start-up. Accordingly, even if the phase compensation CR circuit (the phase compensation resistor Rfc and phase compensation capacitor Cfc) makes blunt the rise of the error voltage Vith at start-up, the error voltage Vith can reach the output current setting reference voltage Viref2 quickly.

As a result, the amplifier AMP2 yields a positive output voltage, and accordingly the comparator CMP1 is fed with an offset voltage Vofs that permits the output of a positive output current "io." Thus, it is possible to eliminate the conventionally experienced delay in the rise of the output voltage Vo immediately after start-up. This permits the output voltage Vo itself to reach the variable reference voltage Va quickly after start-up. In this way, it is possible to prevent the error voltage Vith from becoming far higher than the second constant reference voltage Viref and thereby prevent an overshoot in the output voltage Vo.

Thereafter, when the variable reference voltage Va becomes higher than the first constant reference voltage Voref, the amplifier AMP1 comes to use the first constant reference voltage Voref as the output voltage setting reference voltage with which it compares the output voltage Vo. Moreover, when the variable reference voltage Va becomes higher than the second constant reference voltage Viref, the amplifier AMP3 comes to feed out the second constant reference voltage Viref as the output current setting reference voltage Viref2. With this configuration, it is possible to keep both the output voltage Vo and the output current "io" constant in the steady state.

On the other hand, when the DC/DC converter of this embodiment is shut down by stopping the supply of electric power thereto, the variable reference voltage Va starts falling by being discharged through the constant current source I2. Here, after the variable reference voltage Va becomes lower than the first constant reference voltage Voref, the amplifier AMP1 comes to use the variable reference voltage Va as the output voltage setting reference voltage with which it compares the output voltage Vo. Moreover, after the variable reference voltage Va becomes lower than the second constant reference voltage Viref, the amplifier AMP3 comes to feed out the variable reference voltage Va as the output current setting reference voltage Viref2. In this way, after shut-down, the variable reference voltage Va, i.e., the terminal voltage of the constant current source I2, is used as the output current setting reference voltage Viref2 with which the error voltage Vith is compared. This makes it possible to prevent an undershoot in the output voltage Vo.

In the embodiment described above, from the viewpoint of avoiding unnecessarily increasing the number of components, the terminal voltage Va of the soft-start capacitor Css is used as the source of the variable voltage to be fed to the non-inverting input terminal (+) of the amplifier AMP3. It is to be understood, however, that the present invention may be carried out with any other configuration. For example, it is possible to use as the variable voltage source any voltage source of which the output voltage rises more gently than the error voltage Vith does.

As described above, a DC/DC converter embodying the present invention is provided with a capacitor and/or discharge circuit for adjusting the output voltage with a view to preventing an overcurrent from flowing through the output transistor at start-up and/or shut-down, and is so configured as to convert an input voltage to an output voltage having a predetermined voltage level and then output the output voltage through the output transistor, which is driven by PWM. Here, during most of the period after the start-up until the voltage at one end of the voltage adjustment capacitor reaches the predetermined voltage level and/or during most of the period after the shut-down until the voltage at one end of the voltage adjustment discharge circuit reaches the predetermined voltage level, the output voltage and the voltage at one end of the voltage adjustment capacitor and/or discharge circuit vary in such a way as to describe curves substantially similar to each other.

With this configuration, it is possible to prevent destruction of the output transistor resulting from an overcurrent and deterioration of the load by eliminating or reducing an abrupt rise in the output voltage at start-up and the resulting overshoot therein and/or an abrupt fall in the output voltage at shut-down and the resulting undershoot therein.

What is claimed is:

1. A DC/DC converter comprising:
    an output transistor for converting an input voltage into an output voltage having a predetermined voltage level and then outputting the output voltage; and
    an output voltage adjustment capacitor for preventing an overcurrent from flowing through the output transistor at start-up,
    wherein, during most of a period after the start-up until a voltage at one end of the output voltage adjustment capacitor reaches the predetermined voltage level, the output voltage and the voltage at one end of the output voltage adjustment capacitor vary in such a way as to describe curves substantially similar to each other.

2. A DC/DC converter comprising:
    an output transistor for converting an input voltage into an output voltage having a predetermined voltage level and then outputting the output voltage; and
    an output voltage adjustment discharge circuit for preventing an overcurrent from flowing through the output transistor at shut-down,
    wherein, during most of a period after the shut-down until a voltage at one end of the output voltage adjustment discharge circuit reaches the predetermined voltage level, the output voltage and the voltage at one end of the output voltage adjustment discharge circuit vary in such a way as to describe curves substantially similar to each other.

3. A DC/DC converter comprising:
    an output switching device for converting an input voltage into an output voltage having a predetermined voltage level and then feeding the output voltage to a load;
    a driver for driving the output switching device according to an output current to the load;
    a variable reference voltage source for generating a variable reference voltage that starts rising at start-up and/or that starts falling at shut-down;
    a first constant reference voltage source for generating a first constant reference voltage;
    a second constant reference voltage source for generating a second constant reference voltage;
    an error voltage generator for finding an error voltage between the output voltage and a first reference voltage; and
    an output current controller for controlling how the driver drives the output switching device according to a differential voltage between the error voltage and a second reference voltage,
    wherein the error voltage generator uses as the first reference voltage whichever of the variable reference voltage and the first constant reference voltage is lower, and the output current controller uses as the second reference voltage whichever of the variable reference voltage and the second constant reference voltage is lower.

4. A DC/DC converter as claimed in claim 3,
    wherein the variable reference voltage rises and/or falls more gently than the error voltage.

5. A DC/DC converter as claimed in claim 3,
    wherein the variable reference voltage source includes:
        a first constant current source having one end thereof connected to a supply voltage line;
        a capacitor having one end thereof connected to the other end of the first constant current source and having the other end thereof grounded;
        a second constant current source having one end thereof connected to the other end of the first constant current source and having the other end thereof grounded,
    wherein a voltage at a node at which the first and second constant current sources and the capacitor are connected together is used as the variable reference voltage.

6. A DC/DC converter as claimed in claim 3,
    wherein an output end of the error voltage generator is grounded through a phase compensation resistor and a phase compensation capacitor.

7. A DC/DC converter as claimed in claim 3,
    wherein the output switching device is a pair of field-effect transistors connected in series between different potentials.

* * * * *